United States Patent [19]

Okamura

[11] Patent Number: 5,408,273

[45] Date of Patent: Apr. 18, 1995

[54] MUTING CIRCUIT FOR A TELEVISION RECEIVING SET

[75] Inventor: Masahiko Okamura, Osaka, Japan

[73] Assignee: Matsushita Electric Industrial Co., Ltd., Osaka, Japan

[21] Appl. No.: 72,703

[22] Filed: Jun. 7, 1993

[30] Foreign Application Priority Data

Jun. 8, 1992 [JP] Japan .................... 4-147249

[51] Int. Cl.6 .................. H04N 5/44; H04N 5/445; H04N 5/60
[52] U.S. Cl. .................................... 348/632; 348/738
[58] Field of Search ............... 358/165, 147, 188, 146, 358/142, 181, 86, 191.1; H04N 5/44, 5/445, 5/60; 348/564, 565, 738, 632

[56] References Cited

U.S. PATENT DOCUMENTS

| 4,554,584 | 11/1985 | Elam et al. | 358/165 |
| 5,128,987 | 7/1992 | McDonough et al. | 379/102 |
| 5,327,176 | 7/1994 | Forler et al. | 348/564 |

FOREIGN PATENT DOCUMENTS 1-126083  5/1989  Japan .
4-29478   1/1992  Japan .

OTHER PUBLICATIONS

"New VCRs Compatable With VHS, VHS-C Formats" Times Union (AL)-Thursday May 16, 1991, Jonathan Takiff Knight-Rider.

"Mulhport for ATV?" Consumer Electronics, Dec. 18, 1989, P. N/A.

High Tech Closed-Captioned TV Not Just For Hearing-Impared Anyone "Daily News of Los Angeles (LA)-Thursday", May 13, 1993 by Jonathan Takiff, p. L. 23, Edition VALL Section, LA FIFE.

Primary Examiner—James J. Groody
Assistant Examiner—Glenton B. Burgess
Attorney, Agent, or Firm—Ratner & Prestia

[57] ABSTRACT

A muting circuit for a television receiving set comprises a mute-judging part, a mute key input, an acoustic output circuit, a caption-judging part, and a caption key input. The mute-judging partenters a mute ON and a mute OFF state alternately every time it receives a mute key input signal. The acoustic output circuit reduces the sound output level to zero decibels at the mute ON state, and restores the sound output at the mute OFF state. The caption-judging part enters a caption ON state and caption OFF state alternately every time it receives a caption key input signal while it enters a caption ON state if the mute-judging part enters a mute ON state. Thus, in the mute ON stated the closed caption is displayed on the screen.

7 Claims, 1 Drawing Sheet

MUTING CIRCUIT FOR A TELEVISION RECEIVING SET

FIELD OF THE INVENTION

This invention relates to a muting circuit used for a television receiver et al., and, more specifically, to a muting circuit which provides a means to output, when the audio signal is muted, information relating to the audio signal in the form of a character display.

BACKGROUND OF THE INVENTION

In recent years, increased performance of audiovisual apparatus has been pursued. In a television receiving set, a muting circuit is useful as it can eliminate acoustic output while maintaining the image when, for instance, a phone call is received or a child begins to sleep. Conventional technology relating to muting circuits which are used in a television receiver is explained below referring to the drawing.

FIG. 2 is a block diagram of a conventional muting circuit, which involves a mute key input 7, a mute-judging part which achieves either muting or non-muting based upon the mute key input, and an audio output circuit 9 which outputs sound responsive to appropriate signals provided by the mute-judging part 8.

When a muting signal enters the mute key input 7 in the muting circuit, the mute-judging part 8 initiates muting of the acoustic output circuit. The audio output circuit 9, upon receiving appropriate signals from mute-judging part 8, reduces the sound volume to zero decibels, thus achieving muting. If, however, a further signal enters the mute key input 7, the mute judging part 8 generates appropriate signals to conclude muting, and the audio output circuit 9, in turn, restores the previous audio output level. Thus, muting is completed. The conventional structure as mentioned had a shortcoming, however, namely, when an appropriate mute key input signal is applied and the sound is suppressed, any information contained in the audio output (e.g. speech content) is unavailable to the television viewer.

SUMMARY OF THE INVENTION

A muting circuit for a TV receiver set is disclosed which, when muted, provides closed caption information relating to the content of the audio output on the screen.

The muting circuit according to the present invention comprises a mute-judging part to evaluate a mute key input signal, a caption-judging part to evaluate the caption key input signal and the state of the mute-judging part, a caption output circuit receiving appropriate signalling from the caption-judging part to control the closed caption, and an audio output circuit which receives appropriate signalling from the mute-judging part to control the output acoustic volume. The mute-judging part generates signals corresponding to a muting state and mute-releasing state alternately every time the mute key input signal is received, and the audio output circuit reduces the output acoustic volume level to zero decibels or a previously set low level in the mute state and recovers the audio output level in a mute-releasing state.

The caption-judging part enters a caption ON state and a caption OFF state alternately every time it receives the caption key input signal. The caption-judging part can also be set, when the mute-judging part is in a muting state, to either be in a caption ON state or a caption OFF state regardless of the caption key input signal.

The caption output circuit displays closed caption information on the screen.

DETAILED DESCRIPTION OF THE EMBODIMENT

Figure 1:
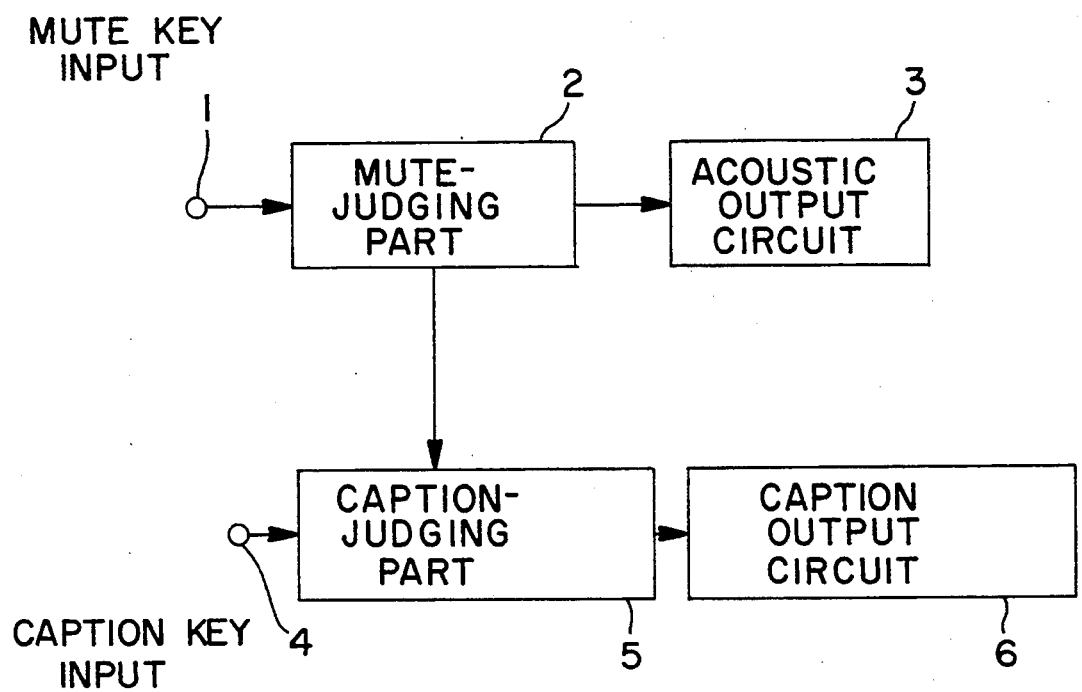
FIG. 1 is a block diagram of a muting circuit in accordance with an exemplary embodiment of the present invention.
Figure 2:
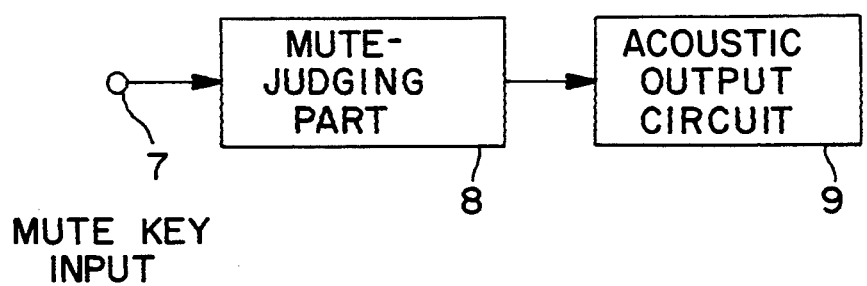
FIG. 2 is a block diagram of a conventional muting circuit.

Referring to FIG. 1, the muting circuit according to an exemplary embodiment of the present invention comprises, a mute key input 1, a mute-judging part 2, an acoustic output circuit 3, a caption key input 4, a caption-judging part 5, and a caption output circuit 6. The mute-judging part 2 determines, based upon a signal, which entered mute key input 1, whether the audio output signal should be muted, the acoustic-output circuit 3 determines and adjusts the volume of the acoustic output according to information obtained from the mute-judging part 2, the caption-judging part 5 determines the caption mode based upon the caption key input 4 and information received from the mute-judging part 2, and the caption output circuit 6 controls the closed caption display based upon information received from the caption-judging part 5.

When the mute key input 1 receives an appropriate input signal, the mute-judging part 2 initiates muting. The acoustic output circuit 3, upon receiving an appropriate signal from the mute-judging part 2, reduces the output acoustic volume level to zero. If the caption-judging part 5, which has been OFF due to previous input signals, obtains appropriate information from the mute-judging part 2, it places the caption mode in an ON state. As a result, the caption output circuit 6 enters a caption ON state so as to display the caption which was previously hidden from view.

If, the mute key input 1 receives a further input signal, the mute-judging part 2 interprets this as a request to conclude muting, and the acoustic output circuit 3, with this information, restores the previous volume of sound. The caption-judging part 5, after receiving appropriate signals from the mute-judging part 2, generates an appropriate signal to place the caption mode in an OFF state. As a result, the caption output circuit 6 enters a caption OFF state, causing the caption on the display to disappear. This sequence is repeated every time the mute key input 1 receives an input signal.

When the mute-judging part 2 is in mute-release state and the caption mode of the caption-judging part 5 is an OFF state, if the caption key input 4 receives an appropriate input signal, the caption-judging part 5 enters a caption OFF stated and, if the caption key input 4 receives a further input signal, then the caption mode enters an OFF state. If in this state, an appropriate input signal enters the mute key input 1, the mute-judging part 2 determines that muting should occur, and the caption-judging part 5, after receiving appropriate signals from the mute-judging part 2, determines that the caption should appear, and displays the caption on the screen via the caption-output circuit 6. If the caption key input 4 receives a further input signal, the caption-judging part 5 can end the display of the caption, regardless of the state of the mute-judging part 2.

Other modes can also be set. When the mute-judging part 2 is in a mute-release state and the caption mode of the caption-judging part 5 if OFF, if the caption key input 4 receives an appropriate input signal, then the caption-judging part 5 enters a caption ON state. If the caption key input 4 receives a further appropriate input signal, then the caption mode enters an OFF state. If in this state, an appropriate input signal is received by the mute key input 1, then the mute-judging part 2 initiates muting, and the caption-judging part 5, with appropriate signals from the mute-judging part 2, enters a caption mode ON state. If, in the above case the caption mode is in an ON stated and the caption key input 4 receives a further input signal, the caption-judging part 5 may keep the caption mode in an ON state neglecting the caption key input signal, as long as the mute-judging part is in mute state if such mode of usage is preferred. When the mute-judging part is in an OFF state, and the caption-judging part 5 is already in a caption mode ON stated if the mute key input 1 receives an appropriate input signal, then the caption-judging part 5 is maintained in a caption mode ON stated and even if the caption key input 4 receives a further input signal, the caption-judging part 5 is maintained in a caption mode ON state despite the input signals which are transmitted to the caption key input 4, as long as the mute-judging part 2 is in a mute state. This priority state is released by a further input signal which is transmitted to the mute key input 1. That is, the caption ON state is maintained, as long as the mute state is maintained. The above two cases may be set when the equipment is manufactured or may be set to be changeable depending on the preference of the user.

As is described above, according to an exemplary embodiment of the present invention, by providing the conventional muting circuit with a caption-judging part 5 and a caption output circuit 6 which can place the caption mode in an ON state when being muted, an appropriate caption is displayed while the sound is muted.

Generation of the mute key input signal or the caption key input signal may be obtained either directly or through remote control means. The muting state is not confined to a zero-volume sound. Low volume sound may also be obtained.

Thus, a muting circuit according to an exemplary embodiment of the present invention comprises a mute-judging part which evaluates a mute key input signal, a caption-judging part which selectively enters a caption mode based upon a caption key input signal and the state of the mute-judging part, a caption output circuit evaluating the state of the caption-judging part and controlling the closed caption display, and an acoustic output circuit which receives signals indicative of the state of the mute-judging part, adjusts the output sound volume, and, when the muting state is set; displays on the screen the sound content.

What is claimed:

1. A muting circuit comprising:
   mute-judging means for receiving a mute key input signal and for generating a muting signal responsive to said mute key input signal,
   caption-judging means for receiving a caption key input signal and said muting signal and for generating a caption signal responsive to either one of said caption key input signal and said muting signal, said caption-judging means also for
   (1) generating a caption ON state if the mute-judging means enters a mute state,
   (2) remaining in said ON state when said caption-judging means is in said caption ON state and said mute-judging means enters said mute state, and
   (3) remaining in said ON state when said caption-judging means is in said caption ON state and said mute-judging means (a) enters said mute state and (b) subsequently enters a mute-releasing state exiting said mute state,
   caption output means for receiving said caption signal and for enabling closed caption display responsive to said caption signal, and
   acoustic output means for receiving the muting signal from said mute judging means and for enabling sound output with a predetermined volume level responsive to said muting signal.

2. A muting circuit according to claim 1, wherein the mute-judging means enters said mute state and said mute-releasing state every time the mute key input signal is received and the acoustic output circuit make the sound output zero or a small volume set previously in the muting state and recovers a previous sound output when the muting state is released.

3. A muting circuit according to claim 1, wherein the caption-judging means generates said caption ON state and a caption OFF state alternately every time the caption key input signal is received, and, if the mute-judging means enters the mute state, then the caption-judging means enters the caption ON state regardless of the input of the caption key, and, further, when a caption key input signal enters at this state it becomes said caption OFF state.

4. A muting circuit according to claim 1, wherein the caption-judging means enters the caption ON state and a caption OFF state alternately every time the caption key input signal is received, and, if the mute-judging means enters the mute state, the caption-judging part becomes the caption ON state regardless of the input of the caption key, and, keeps this state neglecting the caption key input signal.

5. A muting circuit according to claim 1, wherein the caption output circuit displays a closed caption image on a television screen.

6. A muting circuit according to claim 3, wherein the caption output circuit displays a closed caption image on a television screen.

7. A muting circuit according to claim 4, wherein the caption output circuit displays closed image caption on a television screen.

* * * * *

UNITED STATES PATENT AND TRADEMARK OFFICE
CERTIFICATE OF CORRECTION

PATENT NO. : 5,408,273
DATED : April 18, 1995
INVENTOR(S) : Okamura

It is certified that error appears in the above-indentified patent and that said Letters Patent is hereby corrected as shown below:

On the cover page, in the Abstract [item 57], line 4, "partenters" should be --part enters--.

On the cover page, in the Abstract [item 57], line 13, "stated" should be --state,--.

Column 4, lines 48-49, "part becomes" should be --means enters--.

Column 4, line 59, after "displays" insert --a--.

Signed and Sealed this

Twenty-first Day of November, 1995

Attest:

BRUCE LEHMAN

Attesting Officer

Commissioner of Patents and Trademarks